March 28, 1944. H. HIRSCH ET AL 2,345,197
FISHHOOK AND METHOD OF PRODUCING SAME
Filed Nov. 25, 1941
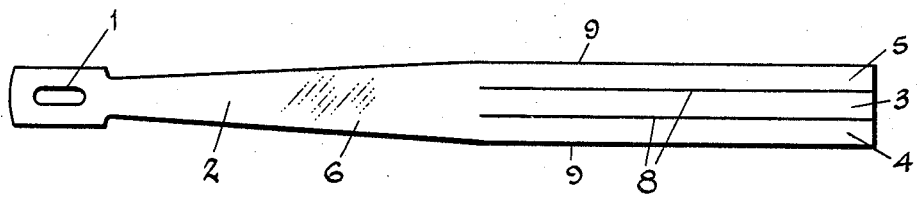
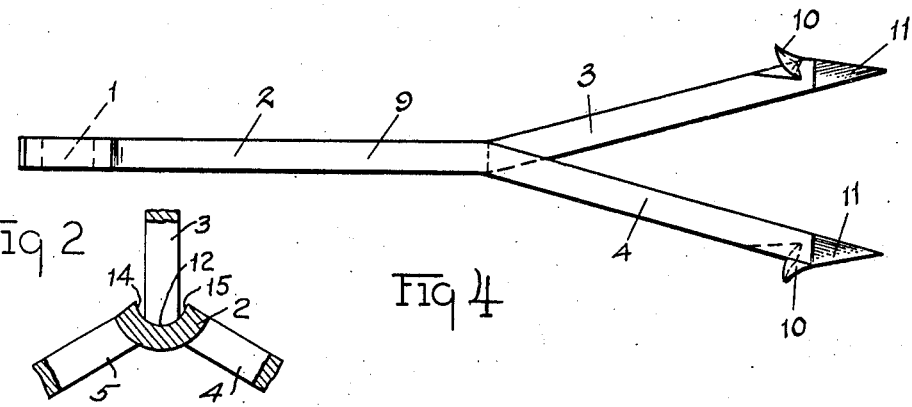
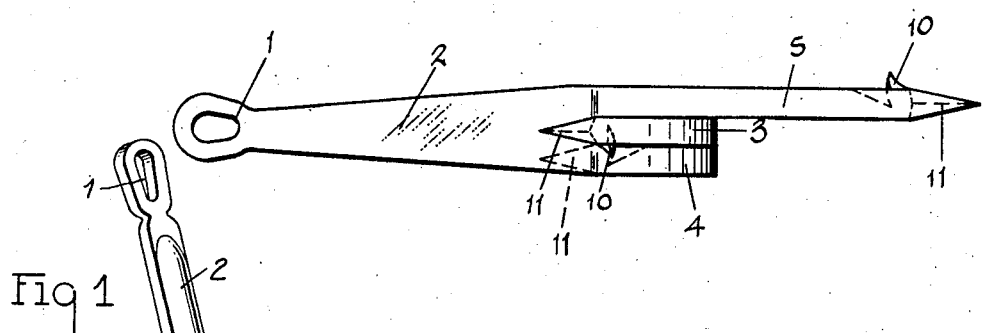
Inventors
Henry Hirsch
William Burl Saul
By ~~~~
Attorney Patented Mar. 28, 1944

2,345,197

UNITED STATES PATENT OFFICE 2,345,197

FISHHOOK AND METHOD OF PRODUCING SAME

Henry Hirsch and William Burl Saul, Toledo, Ohio

Application November 25, 1941, Serial No. 420,396

6 Claims. (Cl. 29—9)

Our invention relates to fishing tackle. The invention particularly relates to a fish hook having various novel and efficient features and to a method whereby said fish hook may be produced economically.

Among the objects of our invention is that of providing a multiple bend fish hook, as, for example, a double or treble fish hook. A corollary object of our invention is to provide a multiple bend fish hook of a design which readily lends itself to production, at low cost and in great volume, by automatic or semi-automatic machinery. Heretofore, such multiple bend fish hooks, as were available to consumers thereof, have been the product of manual labor. Hooks produced in accordance with such methods are rapidly coming to be expensive, by the standards of other manufactured products, and in view of the limited advantages and features of the fish hooks so produced.

Our invention, when embodied in physical form, lends itself to production of fish hooks, the metal of which has been subjected to substantially no stress and strains in the formation thereof, as is caused by twisting, looping, and welding in the prior art structures, and thus is inherently stronger and resistant to break. The advantages of strength and resistance to breakage are further obtained in embodiments of our invention by reason of the design thereof. In this latter connection, our invention provides a shank for a fish hook of greatly increased strength and resistance to twist, shear, and tensional fractures, particularly in the area where the shank adjoins the bends.

Another object of the invention is to provide a method of producing a fish hook having the features above referred to, in a novel and efficient manner. The method readily lends itself to machine and volume production of fish hooks.

A particular object of the invention is to provide a fish hook and a method of producing the same formed from flat metal stock, cut to form an eye, a shank, and a plurality of bends, integral with the shank and bent to curves conforming to any of the well known types of bends, the shank being bent laterally to position said bends relative to each other and said shank.

The invention consists in other features and advantages which will appear from the following description and upon examination of the drawing. Structures containing the invention may partake of different forms and still embody the invention. To illustrate a practical application of the invention, we have selected a fish hook and a method for producing the same as an example of the various structures and details thereof that contain the invention and shall describe the selected structure and method hereinafter, it being understood that variations may be made without departing from the spirit of the invention. The particular structure selected is shown in the accompanying drawing and, together with the method, is described hereinafter.

Fig. 1 of the accompanying drawing illustrates a perspective view of a fish hook embodying our invention and produced in accordance with the method of our invention. Fig. 2 illustrates an enlarged transverse section of the shank of the fish hook shown in Fig. 1. Fig. 3 illustrates a plan view of a blank in the process of production of the fish hook shown in Fig. 1, in accordance with the method of our invention. Fig. 4 illustrates a side elevational view of the blank in a later stage of production than that shown in Fig. 3. Fig. 5 illustrates a plan view of the blank in a still later stage of production than that shown in Fig. 4.

The fish hook illustrated in accompanying drawings, as an embodiment of our invention, is formed from an elongated metal stock blank of rectilinear cross section. The blank is cut preferably along planes parallel to the side faces of the blank to form an eye at one end and slits at the other end. The portion of the blank intermediate the eye and slit end embodies the shank body of the hook. The eye may be swedged to substantially annular outline and bent upward or downwardly, relative to the shank, if desired to accord with the style to which the finished hook is to adhere.

The portions of the blank defined by the slits in the slit end, thereof, are each end sharpened and provided, if desired, with a barb appendage. These portions are then curled in accordance with desired bend pattern and style to form the hook bends integral with the shank. The shank is then bent laterally to allocate the bends at various desired angular relation to each other about the major longitudinal axis of the shank.

Referring to the particular fish hook structure illustrated in the accompanying drawing it will be noted that the eye 1, shank 2 and bends 3, 4 and 5 are all formed integral from stock of rectilinear cross section. The eye 1 is formed by cutting and subsequent swedging of the blank 6, shown in Fig. 3, as indicated, and the bends 3, 4, 5 have their inception in the corresponding membered legs formed by the slits 8 in the blank 6 indicated in Fig. 4. The slits 8 are made in planes, preferably parallel to the side faces 9 of the blank 6, so that the legs and the bends formed thereby are rectilinear in cross section. It will be readily apparent that the blank may be subjected to die stamping operations to produce the eye and legs. Large production at low cost may be thus attained.

The ends of the legs are provided with barb appendages, such as that shown at 10, and sharpened ends 11. The legs are then curvedly bent to form bends. The formation of the barbs and ends may be effected during the foregoing stamping operation and the bending be effected by suitable bending dies.

In order to allocate said bends about the major longitudinal axis of the shank and to increase the rigidity and resistance to fracture, thereof, the shank is bent laterally, as shown in Fig. 2 of the drawing, to a near C-shape in cross section. By so bending the shank, the bends 3, 4 and 5 are located at about 120° to each other about the major longitudinal axis of the shank 6. The metal structure between the bends and shank is not disturbed by twisting at points where fracture is most often experienced, resulting in an exceedingly strong combination. Also by so bending the shank, the metal thereof, such as the portions 14 and 15, is placed in bracing position to other metal, thereof, tending to resist longitudinal bends, twist or tensional fracture of the shank, or of the bends relative to the shank. Further by so bending the shank, a surface 12 outlined by angularly related vane like surfaces of the portions 14 and 15 are provided which are reactant to water motion and tend to make the hook rotate and move when subjected to water motion, as when trolling or when immersed in water currents, a feature of advantage in luring the fish to the hook.

We claim:

1. A fish hook having a shank part formed of flattened metal laterally bent to substantially C-shape in cross section and having a circular opening near one end forming a connecting eye for the fish hook; a plurality of legs integral with said shank and extending from the other end thereof; said legs curvedly bent to form multiple hook bends; the free end of each curved leg being sharpened to provide an integument penetrating point.

2. A fish hook having a shank part formed of flattened metal laterally bent to substantially C-shape in cross section and having a circular opening near one end forming a connecting eye for the fish hook; a plurality of legs of rectilinear cross section integral with said shank and extending from the other end thereof; said legs curvedly bent to form multiple hook bends; the free end of each curved leg being sharpened to provide an integument penetrating point.

3. A fish hook having a shank part; the shank part having an opening near one end forming a connecting eye for the fish hook; a plurality of legs integral with said shank and extending from the other end thereof; said legs curvedly bent to form multiple hook bends; the free end of each curved leg being sharpened to provide an integument penetrating point.

4. Method of producing a multiple fish hook which includes slitting a metal blank to form a plurality of extensions integrally connected to the blank; curvedly bending said extensions to form hook bends; and laterally bending said blank to locate said bends in spaced relation to each other and about the major longitudinal axis of the blank.

5. Method of producing a multiple fish hook which includes slitting a polyhedral elongated metal blank along a plane extending parallel to a long side surface of said blank to form a plurality of extensions having a rectilinear cross section integrally connected to the blank; curvedly bending said extensions to form hook bends; and laterally bending said blank to locate said bends in spaced relation to each other and about the major longitudinal axis of the blank.

6. A fish hook having a shank part; a plurality of legs integral with said shank and extending from one end thereof; said legs bent to form multiple hook bends; the free end of each leg sharpened to provide an integument penetrating point and the shank being laterally bent to dispose the bent legs in spaced relation to each other and about the major longitudinal axis of the shank.

HENRY HIRSCH.
W. BURL SAUL.